United States Patent [19]
Alhorn et al.

[11] Patent Number: 6,104,328
[45] Date of Patent: Aug. 15, 2000

[54] RESOLVER TO 360° LINEAR ANALOG CONVERTER AND METHOD

[75] Inventors: Dean C. Alhorn, Huntsville; David E. Howard, Hazel Green; Dennis A. Smith, Athens, all of Ala.

[73] Assignee: The United States of America as represented by the Administrator of the National Aeronautics and Space Administration, Washington, D.C.

[21] Appl. No.: 09/208,110

[22] Filed: Nov. 27, 1998

[51] Int. Cl.$^7$ ...................................................... H03M 1/64
[52] U.S. Cl. .............................................................. 341/112
[58] Field of Search ................................... 341/110, 112, 341/116, 115

[56] References Cited

U.S. PATENT DOCUMENTS 4,933,674  6/1990  Gasperi et al. ........................ 341/112
5,347,277  9/1994  Nondahl ................................ 341/112

*Primary Examiner*—Brian Young
*Attorney, Agent, or Firm*—James J. McGroary

[57] ABSTRACT

The converter produces a linear analog signal that is linearly proportional to a shaft angle of a resolver over 360°. An excitation cosine signal supplied to the resolver and a response cosine signal received from the output windings of the resolver are converted to logic level signals. Digital logic is performed on the logic level signals in a programmable digital logic device to produce a logic level pulse-width modulated signal. The logic level pulse-width modulated signal is used to control a switch to switch between two reference voltage levels to produce a pulse-width modulated signal, which is filtered and buffered to produce the linear analog signal.

19 Claims, 4 Drawing Sheets

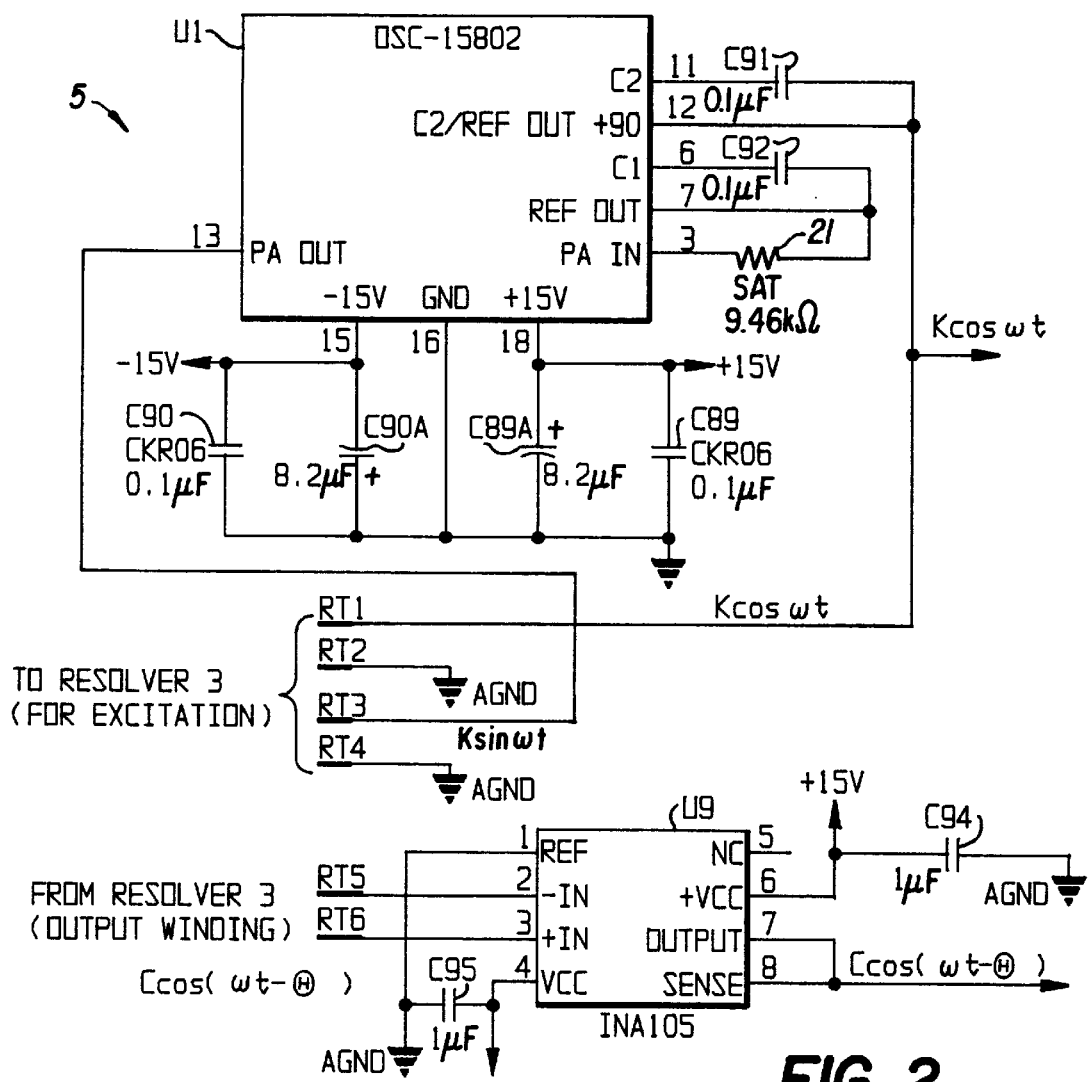
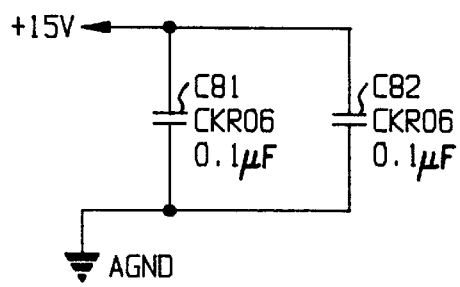
FIG. 2
FIG. 5

RESOLVER TO 360° LINEAR ANALOG CONVERTER AND METHOD

ORIGIN OF THE INVENTION

This invention was made by employees of the United States Government and may be manufactured and used by or for the United States Government for Governmental Purposes without the payment of royalties.

BACKGROUND OF THE INVENTION

1. Field of the Invention

The invention is directed to a converter and method for determining a phase difference between two signals, particularly when the first signal is an excitation signal supplied to a resolver and the second signal is a response signal received from the resolver, so that the phase difference is equal to the shaft angle of the resolver.

2. Description of Related Art

Many applications require position sensing. One of the most robust, reliable, and often used position sensors is called a resolver. Resolvers require external excitation signals and output signal conditioning to obtain a usable signal (whether digital or analog) proportional to angular position.

Resolvers commonly use arc tangent integrated circuits for performing arc tangent conversion and resolver-to-digital integrated circuits. The available arc tangent integrated circuits perform arctangent conversion, but can operate only over a limited range, namely, from −90° to +90°, exclusive. However, this limited range creates a major problem for devices such as resolvers that function over a full 360° range.

Conventional resolver-to-digital circuits have a disadvantage in that they provide a discrete output instead of a continuous linear output, when the latter would be desirable for many purposes. Another circuit developed at NASA seeks to address this disadvantage, but requires precision analog circuitry and trigonometric identities to be implemented in the output signal conditioning circuit. Both of these tend to be noise-sensitive, require precision components, require gain and phase matching, drift with temperature, and are expensive to implement.

SUMMARY OF THE INVENTION

It is an object of the invention to provide a converter circuit capable of operating over a 360° range.

It is another object of the invention to provide a converter circuit which provides a continuous linear output.

It is a further object of the invention to provide a converter circuit which is not noise-sensitive, which does not require precision components, which does not require gain and phase matching, which has minimal drift with temperature, and which is inexpensive to implement.

To achieve these and other objects, the present invention is directed to a converter for determining a phase difference $\Theta$ between a first signal and a second signal, the converter comprising: pulse-width modulation means for receiving the first signal and the second signal, for determining a logic level first signal from the first signal and a logic level second signal from the second signal, and for determining a logic level pulse-width modulated signal from the logic level first signal and the logic level second signal, the logic level pulse-width modulated signal being linearly proportional to the phase difference $\Theta$; and linear representation means for receiving the logic level pulse-width modulated signal from the pulse-width modulation means, for producing a pulse-width modulated waveform from the pulse-width modulated signal, and for producing a linear representation signal from the pulse-width modulated waveform signal, the linear representation signal being linearly proportional to the phase difference $\Theta$.

The invention is further directed to a series of operational steps, to be performed with an electronic circuit, for determining a phase difference $\Theta$ between a first signal and a second signal, the series of operational steps comprising: (a) determining a logic level first signal from the first signal and a logic level second signal from the second signal; (b) determining a logic level pulse-width modulated signal from the logic level first signal and the logic level second signal, the logic level pulse-width modulated signal being linearly proportional to the phase difference $\Theta$; (c) producing a pulse-width modulated waveform from the pulse-width modulated signal; and (d) producing a linear representation signal from the pulse-width modulated waveform signal, the linear representation signal being linearly proportional to the phase difference $\Theta$.

BRIEF DESCRIPTION OF THE DRAWINGS

A preferred embodiment of the invention will be described in detail with reference to the drawings, in which:

FIG. 2 shows a circuit diagram of the cosine signal portion of the converter circuit of FIG. 1;

FIG. 5 shows a circuit diagram of a power source conditioner used in the converter circuit of FIG. 1.

DESCRIPTION OF THE PREFERRED EMBODIMENT

Figure 1:
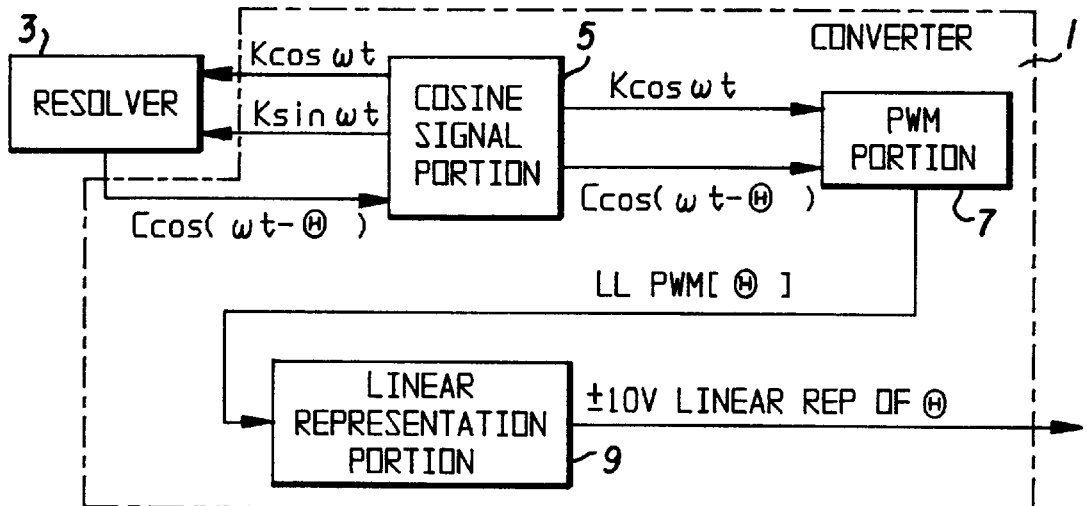
FIG. 1 shows an overview of a converter circuit according to the preferred embodiment.

FIG. 1 shows an overview of converter 1 according to the preferred embodiment connected to resolver 3. For ease of explanation, converter 1 will be treated as being formed in three portions, namely, cosine signal portion 5, pulse wave modulation (PWM) portion 7, and linear representation portion 9. However, converter 1 need not be produced in the form of three integrated circuits; instead, it may be formed as a single integrated circuit or composed of any number of circuit elements.

Figure 3:
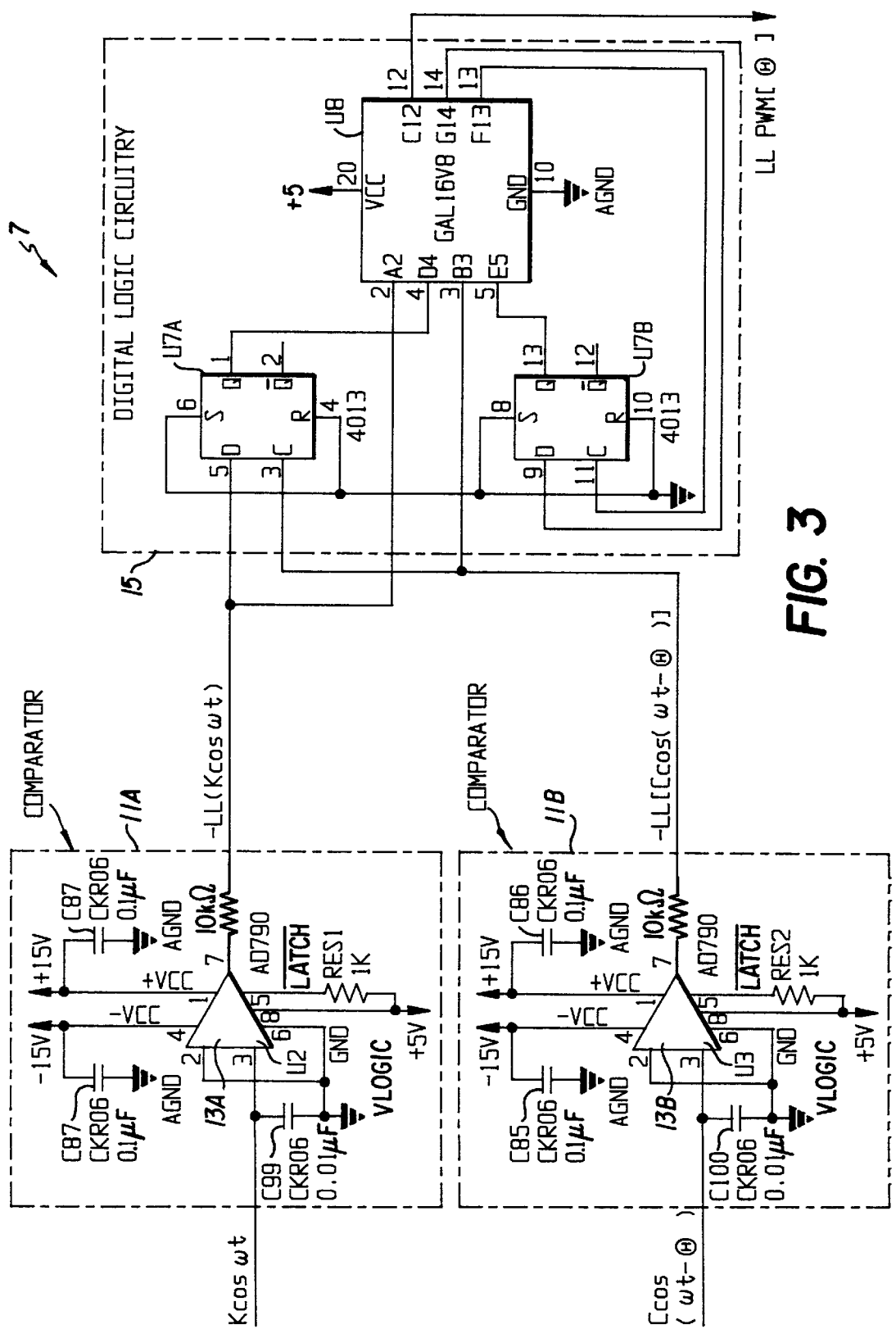
FIG. 3 shows a circuit diagram of the PWM portion of the converter circuit of FIG. 1.
Figure 4:
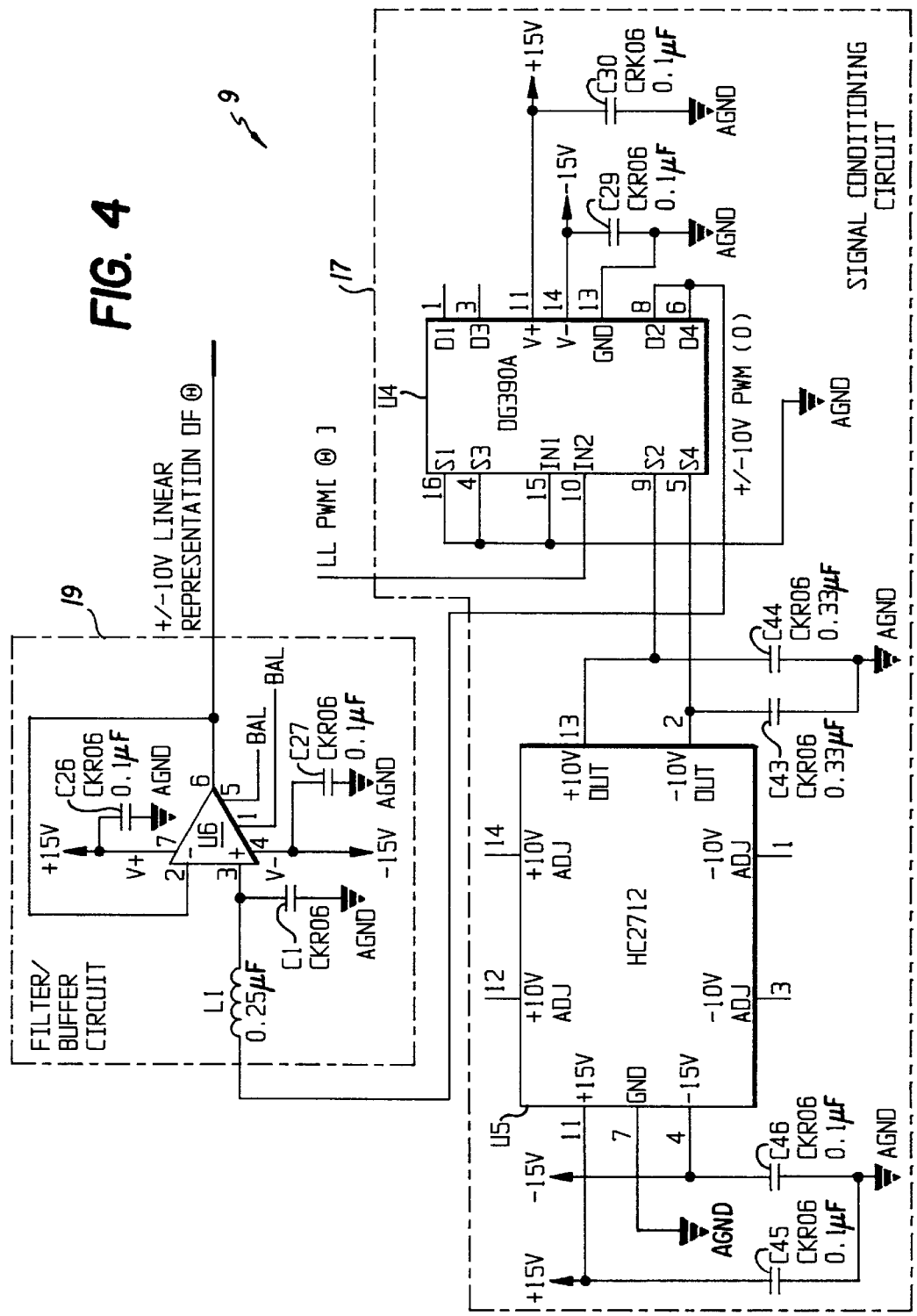
FIG. 4 shows a circuit diagram of the linear representation portion of the converter circuit of FIG. 1.

Detailed diagrams of these portions are shown in FIGS. 2–4, respectively. In FIGS. 2–4, unless otherwise noted, capacitor values are in micro farads ($\mu$F), while resistor values are in ohms ($\Omega$).

Cosine signal portion 5 produces cosine and sine waveforms that are used as input excitations to resolver 3. These waveforms are represented by K sin $\omega$t and K cos $\omega$t, where $\omega$ is the carrier frequency in radians per second, t is time in seconds, and K is the peak amplitude of the waveforms. The carrier frequency can also be expressed as a carrier frequency f in hertz, where the two expressions for the carrier frequency are related as $\omega = 2\pi f$. In a preferred embodiment, f=10 kHz. In response to these excitations, the output windings of resolver 3 output signals are represented by C sin ($\omega$t−$\Theta$) and C cos ($\omega$t−$\Theta$), where C is the peak amplitude of the output signals and $\Theta$ is the shaft angle of the resolver, namely, the quantity ultimately to be determined.

FIG. 2 shows cosine signal portion 5 in greater detail. While FIG. 2 shows a particular embodiment of cosine signal portion 5, any other oscillator can be used as long as it is capable of outputting sine and cosine inputs having the same frequency and the same amplitude.

In cosine signal portion 5, oscillation circuit U1 has +15V, −15V, and ground inputs connected to power and ground in the following manner. The +15V input is connected to a +15V supply directly and to ground via capacitors C89 and C89A. The ground input is connected directly to ground. The −15V input is connected to a −15V supply directly and to ground via capacitors C90 and C90A. On the output side of oscillation circuit U1, the REF OUT +90 output directly and the C2 output through capacitor C91 are summed to provide the K cos ωt waveform, while the REF OUT output directly and the C1 output through capacitor C92 are summed to provide a non-amplified version of the K sin ωt waveform. The capacitances of capacitors C91 and C92 determine ω. The non-amplified version of the K sin ωt waveform is fed through a SAT (select-at-test) resistor 16 into the third (PA IN, or power amplifier in) pin to be amplified within circuit U1. The waveform thus amplified is output through the thirteenth (PA OUT) pin as the version of the K sin ωt waveform that is ultimately used.

These waveforms are supplied to resolver 3 via resolver terminals RT1 and RT3, respectively, while corresponding resolver terminals RT2 and RT4 are grounded. The waveforms can be buffered before being supplied to resolver 3.

The SAT resistor is called "select-at-test" because when cosine signal portion 5 is tested, the value of the resistor is selected to ensure that the sine and cosine waveforms have the same amplitude. In one tested circuit, the SAT resistor had a resistance of approximately 9.46 kΩ.

Cosine signal portion 5 also receives an output from the output windings of resolver 3 through resolver terminals RT5 and RT6. In particular, terminal RT6 supplies the output signal C cos (ωt−Θ). The outputs received from resolver terminals RT5 and RT6 are supplied to the −In and +In terminals, respectively, of buffer circuit U9, which is a differential buffer circuit with a gain of one. The Ref and −Vcc terminals of circuit U9 are connected to ground and to a −15V source, respectively, and are also connected to each other through capacitor C95. The +Vcc terminal is connected to a +15V source directly and to ground through capacitor C94. The Output and Sense terminals are connected and provide a signal representing C cos (ωt−Θ).

PWM portion 7 is shown in detail in FIG. 3. PWM portion 7 receives one of the excitation signals and one of the output signals, namely, K cos ωt and C cos (ωt−Θ), and applies them to inverting comparator circuits 11A and 11B, respectively. Since these inverting comparator circuits have the same construction, a single description will be provided for both.

Inverting comparator circuit 11A (11B) is formed around AD790 amplifier 13A (13B) (also labelled U2 (U3) respectively). The +input of amplifier 13A (13B) is grounded, while the input is connected to cosine signal portion 5 to receive the appropriate cosine signal and is also connected to ground through capacitor C99 (C100). The −VCC and +VCC power inputs are connected to −15V and +15V sources, respectively, and are also grounded through capacitors C87 (C85) and C88 (C86), respectively. The GND terminal is grounded. The VLogic and inverted LATCH terminals are connected to a +5V source directly and through 1 kΩ resistor RES1 (RES2), respectively. The output is passed through a 10 kΩ resistor.

Inverting comparator circuits 11A and 11B receive the K cos ωt and C cos (ωt−Θ) signals, respectively, and signal-condition these signals to produce square-wave signals having 0–5V levels. These square-wave signals are inverted logic levels of the signals recieved from cosine signal portion 5 and are represented by −LL (K cos ωt) and −LL (C cos (ωt−Θ)), respectively.

These inverted logic signals are applied to digital logic circuitry 15 in PWM portion 7. In digital logic circuitry 15, flip-flop circuit U7A receives the signals represented by −LL (K cos ωt) and −LL (C cos (ωt−Θ)) on its D and C inputs, respectively. The R and S inputs are grounded. The Q output of flip-flop circuit U7A is applied to the D4 input of G16V8 programmable logic device U8, whose logic programming will be explained shortly, and which is connected in the following manner. The A2 and B3 inputs receive the −LL (K cos ωt) and −LL (C cos (ωt−Θ)) signals, respectively. The E5 input receives the Q output of flip-flop circuit U7B. The VCC terminal is connected to a +5V source, while the GND terminal is grounded. The C12 and G14 outputs are applied to the D and C inputs, respectively, of flip-flop circuit U7B, whose R and S inputs are grounded.

Programmable logic device U8 is programmed to perform the following logical operations. If the values at A2, B13, C12, D4, E5, F13 and G14 are written as A, B, C, D, E, F, and G, respectively, then programmable logic device U8 implements the following logic equations:

C=!B;

G=!A; and

F=!(((!(D&E)&(A&B))#((D&E)&(A#B))), where "&," "#," and "!" indicate the logical "AND," "OR," and "NOT" operations, respectively. These logic equations provide an output at F13 which is a pulse-width modulated signal (0–5V level) that is linearly proportional to the shaft angle Θ. This signal is represented by the logic level of PWM (Θ), or LL PWM (Θ).

Linear representation portion 9 receives this signal and signal-conditions it to produce a PWM waveform which switches from a precision +10V level to a precision −10V level. This signal will be identified as ±10V PWM (Θ). Over the full range of Θ, from −180° to +180°, this PWM waveform is linearly proportional to the phase difference between the two signals LL (C cos (ωt−Θ)) and LL (K cos ωt). This phase difference, of course, is equal to Θ.

An example of a circuit for doing this signal conditioning is signal conditioning circuit 17 shown in FIG. 4, which is formed from DG390A switch circuit U4 and HC2712 ten-volt reference circuit U5. Circuit U4 receives the signal represented by LL PWM (Θ) at input IN2. Input IN1 and pins S1 and S3 are grounded, as is the GND terminal. The V+input is connected to a +15V source directly and to ground through capacitor C30. The V−input is connected to a −15V source directly and to ground through capacitor C29.

Terminals S2 and S4 of circuit U4 are connected to the +10V OUT and −10V OUT terminals, respectively, of circuit U5. Terminals S2 and S4 of circuit U4 are also connected to ground through capacitors C44 and C43, respectively. Thus, switch circuit U4 receives the +10V and −10V reference voltages from circuit U5.

The +15V and −15V inputs of circuit U5 are connected directly to +15V and −15V sources, respectively, and are connected to ground through capacitors C45 and C46, respectively. The GND terminal, the two +10V ADJ terminals, and the two −10V ADJ terminals are allowed to float.

In accordance with the LL PWM (Θ) signal received in IN2, switch circuit U4 switches between the +10V and −10V reference voltages and outputs the switched results to terminals D2 and D4. The outputs from terminals D2 and D4 of circuit U4 are summed to provide the ±10V PWM (Θ) signal. This signal is supplied to filter/buffer circuit 19, which is a two-pole low-pass filter which filters out the PWM frequency ω and buffers the output signal. The output of filter/buffer circuit 19, and thus of linear representation portion 9 and of converter 1, is a signal that is a ±10V linear representation of Θ. This signal is related to Θ in the following manner:

| Phase Θ | Voltage output |
|---------|----------------|
| −180°   | −10 V DC       |
| 0°      | 0 V DC         |
| +180°   | +10 V DC       |

Filter/buffer circuit 19 can be implemented in the following manner. The signal ±10V PWM (Θ) is supplied to inductor L1. The output of inductor L1 is connected directly to the +, signal input of LF 356H amplifier U6 and to ground through capacitor C1. The +power input of amplifier U6 is connected directly to a +15V supply and via capacitor C27 to ground. The −, power input of amplifier U6 is connected directly to a +15V supply and via capacitor C26 to ground. The output of amplifier U6 is the ±10V linear representation of Θ and is also fed back to the —signal input of amplifier U6.

The power supply can be conditioned by adding the connection shown in FIG. 5. In this connection, the +15V source is connected to ground via capacitors C81 and C82.

Figure 6:
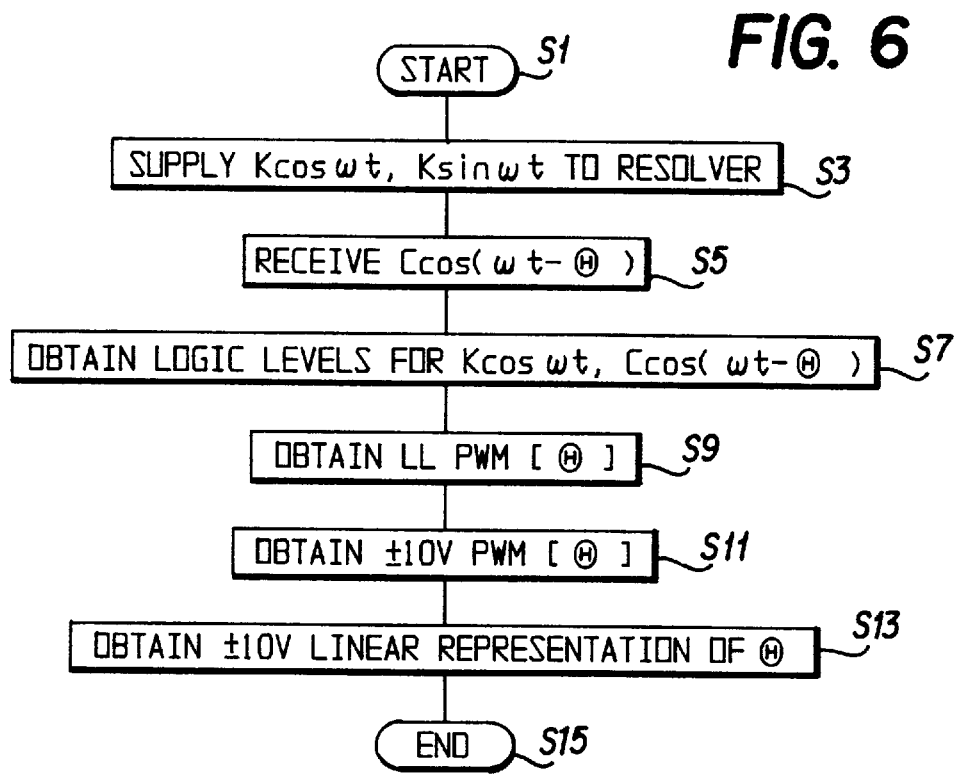
FIG. 6 shows a flow chart of operational steps carried out in the converter circuit of FIG. 1.

FIG. 6 shows an overview of the operation of converter 1. The operation starts in step S1. In step S3, the signals representing K cos ωt and K sin ωt are supplied to the resolver. In step S5, the signal representing C cos (ωt−Θ) is received from the resolver. In step S7, the logic levels of K cos ωt and C cos (ωt−Θ) are obtained. In step S9, these logic levels are used to obtain the logic level LL PWM (ω). From this logic level, ±10V PWM (ω) is obtained in step S11. In step S13, the ±10V linear representation of Θ is obtained. This sequence of steps ends in step S15, although it can be run as often as needed.

This sequence of steps can be implemented in converter 1 or in any other circuit capable of implementing such steps. All or any part of converter 1 can be replaced with an alternative or equivalent electronic component or components. All or any part of converter 1 can be built in any suitable way, as with surface-mount technology, programmable logic devices, or an ASIC (application specific integrated circuit) or ASIC's.

Converter 1 is a linear analog circuit having an infinite resolution that is continuous over the full 360°. Converter 1 works with resolver outputs or with any other outputs in which it is desired to detect a phase difference that can vary continuously over all or part of the full 360°.

Those skilled in the art who have reviewed this disclosure will readily appreciate that other embodiments can be realized within the scope of the invention. For example, modifications disclosed separately can be combined, and modifications disclosed together can be applied separately. The particular circuits, voltages, resistances, inductances, capacitances, and the like are illustrative rather than limiting, since other circuits can be designed within the scope of the invention.

We claim:

1. A converter for determining a phase difference Θ between a first signal and a second signal, the converter comprising:

pulse-width modulation means for receiving the first signal and the second signal, for determining a logic level first signal from the first signal and a logic level second signal from the second signal, and for determining a logic level pulse-width modulated signal from the logic level first signal and the logic level second signal, the logic level pulse-width modulated signal being linearly proportional to the phase difference Θ; and linear representation means for receiving the logic level pulse-width modulated signal from the pulse-width modulation means, for producing a pulse-width modulated waveform from the pulse-width modulated signal, and for producing a linear representation signal from the pulse-width modulated waveform signal, the linear representation signal being linearly proportional to the phase difference Θ.

2. A converter as in claim 1, wherein:

the first signal is an excitation signal supplied to an external device;

the second signal is a response signal received from an external device in response to the excitation signal; and the converter further comprises excitation means for generating the excitation signal, for supplying the excitation signal to both the pulse-width modulation means and the external device, for receiving the response signal from the external device, and for supplying the response signal to the pulse-width modulation means.

3. A converter as in claim 2, wherein the excitation means comprises an oscillator for generating the excitation signal.

4. A converter as in claim 3, wherein:

the excitation signal comprises a cosine signal proportional to cos ωt, where ω is an angular frequency of the cosine signal and t is time; and the response signal is proportional to cos (ωt−Θ).

5. A converter as in claim 1, wherein the pulse-width modulation means comprises:

a first comparator for receiving the first signal and determining the logic level first signal; and a second comparator for receiving the second signal and determining the logic level second signal.

6. A converter as in claim 5, wherein the pulse-width modulation means further comprises digital logic means for receiving the logic level first signal and the logic level second signal and for performing digital logic on the logic level first signal and the logic level second signal to determine the logic level pulse-width modulated signal.

7. A converter as in claim 6, wherein the digital logic means comprises a programmable digital logic circuit.

8. A converter as in claim 1, wherein the linear representation means comprises:

a reference voltage source for outputting a plurality of reference voltage levels; and a switch, receiving the plurality of reference voltage levels and the logic level pulse-width modulated signal, for switching among the plurality of reference voltage levels in accordance with the logic level pulse-width modulated signal to produce the pulse-width modulated waveform.

9. A converter as in claim 8, wherein the linear representation means further comprises a filter/buffer circuit for receiving the pulse-width modulated waveform, for filtering out a pulse-width modulation frequency from the pulse-width modulated waveform, and for buffering a remainder of the pulse-width modulated waveform to produce the linear representation signal.

10. A series of operational steps, to be performed with an electronic circuit, for determining a phase difference $\Theta$ between a first signal and a second signal, the series of operational steps comprising:

(a) determining a logic level first signal from the first signal and a logic level second signal from the second signal;

(b) determining a logic level pulse-width modulated signal from the logic level first signal and the logic level second signal, the logic level pulse-width modulated signal being linearly proportional to the phase difference $\Theta$;

(c) producing a pulse-width modulated waveform from the pulse-width modulated signal; and (d) producing a linear representation signal from the pulse-width modulated waveform signal, the linear representation signal being linearly proportional to the phase difference $\Theta$.

11. A series of operational steps as in claim 10, wherein:

the first signal is an excitation signal supplied to an external device;

the second signal is a response signal received from an external device in response to the excitation signal; and the series of operational steps further comprises generating the excitation signal, supplying the excitation signal to the external device, and receiving the response signal from the external device.

12. A series of operational steps as in claim 11, wherein the excitation signal is generated with an oscillator.

13. A series of operational steps as in claim 12, wherein:

the excitation signal comprises a cosine signal proportional to cos $\omega t$, where $\omega$ is an angular frequency of the cosine signal and t is time; and the response signal is proportional to cos $(\omega t-\Theta)$.

14. A series of operational steps as in claim 11, wherein:

the external device is a resolver; and the phase difference $\Theta$ equals a shaft angle of the resolver.

15. A series of operational steps as in claim 10, wherein step (a) comprises:

determining the logic level first signal from the first signal with a first comparator; and determining the logic level second signal from the second signal with a second comparator.

16. A series of operational steps as in claim 15, wherein step (b) comprises performing digital logic on the logic level first signal and the logic level second signal to determine the logic level pulse-width modulated signal.

17. A series of operational steps as in claim 16, wherein the digital logic is performed with a programmable digital logic circuit.

18. A series of operational steps as in claim 10, wherein step (c) comprises:

outputting a plurality of reference voltage levels; and switching among the plurality of reference voltage levels in accordance with the logic level pulse-width modulated signal to produce the pulse-width modulated waveform.

19. A series of operational steps as in claim 18, wherein step (d) comprises:

filtering out a pulse-width modulation frequency from the pulse-width modulated waveform; and buffering a remainder of the pulse-width modulated waveform to produce the linear representation signal.

* * * * *